No. 721,500. PATENTED FEB. 24, 1903.
S. S. BROMHEAD.
TAP VALVE OR FAUCET.
APPLICATION FILED JULY 12, 1901.
NO MODEL.
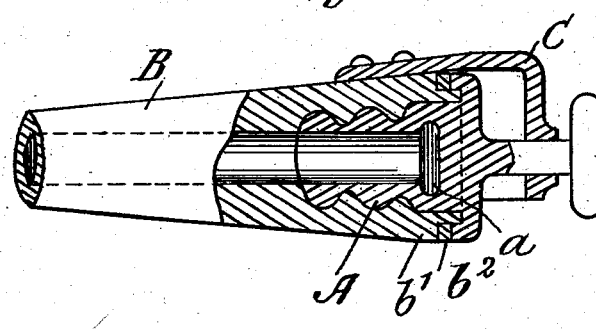
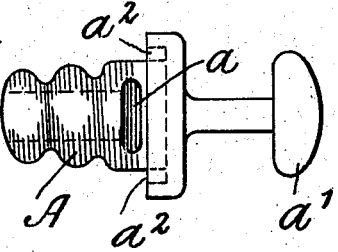
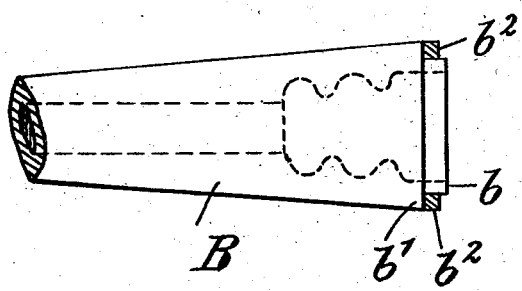
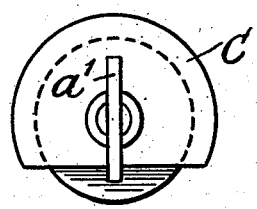
WITNESSES:
Isabella Waldron
Barbara Cambier
INVENTOR.
Samuel Sidney Bromhead
BY
Richard L.
ATTORNEYS

UNITED STATES PATENT OFFICE.

SAMUEL S. BROMHEAD, OF LONDON, ENGLAND.

TAP-VALVE OR FAUCET.

SPECIFICATION forming part of Letters Patent No. 721,500, dated February 24, 1903.

Application filed July 12, 1901. Serial No. 68,063. (No model.)

*To all whom it may concern:*

Be it known that I, SAMUEL S. BROMHEAD, a subject of the King of Great Britain and Ireland, and a resident of London, England, have invented certain new and useful Improvements in Tap-Valves or Faucets, of which the following is a specification.

This invention refers to taps and faucets, external valves, and the like for drawing off liquids from hollow vessels and similar purposes. It is designed to dispense with the present system of vertical plug and socket or of screw-down internal mechanism and to substitute for it a simple inexpensive external valve action capable of being readily examined or repaired and allowing of a large or small flow, as required, and is especially suitable for large sizes of outlets. I take a tube or barrel of any suitable material, which may be rigid or flexible, bent or straight, with tapering or parallel sides, and one end of which may be flanged, screwed, or plain, according to the nature of the vessel to which it is to be attached, and at the other or outer end I form or attach a collar or ring to serve as a bearing or seat for a disk or valve cover, which is arranged to press upon or withdraw to a limited distance from the said seat.

A special feature of my invention is a cap or shield which partly incloses the end of the tube and forms a stop for the plug and a guide for the liquid, directing it down in a vertical direction. The spindle or stem, which operates the closing-disk attached to the plug, passes through this cap and is connected to the hollow screw stopper or plug, the exterior of which resembles the solid screw-stoppers known as "Codd's stoppers," as now used for lemonade-bottles, the neck of the tube or barrel being formed with an internal screw suitable to engage with the stopper, and in some cases the tail of said tube carrying a taper cork or rubber cone to fit into a plain bottle-neck. By preference I form the working parts of the tap of aluminium, copper, or some other metal not liable to rapid oxidation or of vulcanite, wood, stoneware, glass, or other suitable material, and I face the seat of the closing-disk with cork, rubber, or some other suitable packing.

I will now describe the invention with reference to the accompanying drawings, in which—

Figure 1 shows an elevation of my improved tap and part of the barrel in section. Fig. 2 shows an elevation of the hollow plug with its outlet-opening visible. Fig. 3 shows an elevation of the tube or barrel detached from the plug and shield, and the dotted lines show the internal screw. Fig. 4 shows a front view of the tap with the shield in place and the portion of the plug uncovered by the shield.

In the drawings I have shown at B the tap or faucet body, which is preferably tapered, as shown, and is provided with a rabbet around its edge forming a projecting annular lip $b$ and shoulder $b'$ for the reception of an elastic packing $b^2$. A hollow plug A is threaded into the outer end of the body B and is provided with a head having an annular recess $a^3$ to receive the flange or lip of the body or tap and an outer edge to bear against the packing. A suitable handle $a'$ is provided for turning the plug. The plug A is provided with an axial bore corresponding to the bore of the tap and also with a lateral recess $a$, communicating with this bore and designed on the unscrewing of the plug to deliver liquid from the interior of the tap. The outward movement of the plug is limited by a shield, which also serves to direct the liquid downwardly.

Having thus described my invention, what I claim is—

1. In combination, a tap having an axial bore, a hollow plug threaded into the same, and having a lateral opening, a flange encircling the plug, a rim on the tap and a packing-ring against which the flange of the plug bears and a stop through which the stem of the plug extends, substantially as described.

2. In combination, the tap, the hollow plug threaded into the end of the tap and having a transverse opening, a handle for turning said plug and a stop for limiting the outward movement thereof, said stop being in the form of a shield extending over the plug and serving to direct the liquid downwardly, substantially as described.

In witness whereof I have hereunto set my hand in presence of two witnesses.

SAMUEL S. BROMHEAD.

Witnesses:
LILY PARRY,
PHILIP PLOSE.